US012227885B2

(12) United States Patent
Dambrine et al.

(10) Patent No.: US 12,227,885 B2
(45) Date of Patent: Feb. 18, 2025

(54) WOVEN FIBROUS PREFORM FOR PRODUCING A PART FROM COMPOSITE MATERIAL, IN PARTICULAR A TURBOMACHINE BLADE

(71) Applicant: SAFRAN, Paris (FR)

(72) Inventors: Bruno Jacques Gérard Dambrine, Moissy-Cramayel (FR); Yann Didier Simon Marchal, Moissy-Cramayel (FR); Dominique Marie Christian Coupe, Moissy-Cramayel (FR); Marc-Antoine Colot, Moissy-Cramayel (FR)

(73) Assignee: SAFRAN, Paris (FR)

( * ) Notice: Subject to any disclaimer, the term of this patent is extended or adjusted under 35 U.S.C. 154(b) by 281 days.

(21) Appl. No.: 17/795,438

(22) PCT Filed: Jan. 19, 2021

(86) PCT No.: PCT/FR2021/050096
§ 371 (c)(1),
(2) Date: Jul. 26, 2022

(87) PCT Pub. No.: WO2021/152233
PCT Pub. Date: Aug. 5, 2021

(65) Prior Publication Data
US 2023/0093651 A1 Mar. 23, 2023

(30) Foreign Application Priority Data

Jan. 28, 2020 (FR) ...................................... 2000808

(51) Int. Cl.
*F01D 5/28* (2006.01)
*B29B 11/16* (2006.01)
(Continued)

(52) U.S. Cl.
CPC ............ *D03D 25/005* (2013.01); *B29B 11/16* (2013.01); *B29C 70/24* (2013.01);
(Continued)

(58) Field of Classification Search
CPC .............................. F01D 5/282; D03D 25/005
See application file for complete search history.

(56) References Cited

U.S. PATENT DOCUMENTS

| 9,616,629 B2* | 4/2017 | Fabre | .................... F04D 29/324 |
| 2009/0163100 A1 | 6/2009 | Goering | |
| 2016/0245103 A1* | 8/2016 | Gimat | ................... F01D 25/005 |

FOREIGN PATENT DOCUMENTS

| CN | 102666050 A | 9/2012 |
| CN | 102741043 A | 10/2012 |

(Continued)

OTHER PUBLICATIONS

International Search Report as issued in International Patent Application No. PCT/FR2021/050096, dated May 4, 2021.

*Primary Examiner* — Michael L Sehn
(74) *Attorney, Agent, or Firm* — Pillsbury Winthrop Shaw Pittman LLP

(57) ABSTRACT

A fibrous preform for forming the fibrous reinforcement of a composite material part, the fibrous preform being made as a single piece and obtained by three-dimensional weaving, the preform including first and second skins and a longitudinal stiffening portion connecting the first to the second skin, the longitudinal stiffening portion forming a stiffening element of the part in the longitudinal direction. The preform has an intermediate portion extending in the longitudinal direction between two end portions. The longitudinal stiffening portion includes, in the intermediate portion, longitudinal non-woven threads or strands held together by first transverse threads or strands coming from the first skin and second transverse threads or strands coming from the second (Continued)

skin. In the end portions, the longitudinal threads or strands of the longitudinal stiffening portion are woven with the transverse threads or strands.

8 Claims, 9 Drawing Sheets

(51) Int. Cl.
    *B29C 70/24*     (2006.01)
    *B29D 99/00*     (2010.01)
    *D03D 25/00*     (2006.01)
    *B29L 31/08*     (2006.01)

(52) U.S. Cl.
    CPC ......... *B29D 99/0025* (2013.01); *F01D 5/282* (2013.01); *F01D 5/284* (2013.01); *B29L 2031/087* (2013.01); *F05D 2230/31* (2013.01); *F05D 2300/20* (2013.01); *F05D 2300/6034* (2013.01)

(56) References Cited

FOREIGN PATENT DOCUMENTS

| EP | 3 181 814 A1 | 6/2017 |
|----|----|----|
| FR | 3 084 088 A1 | 1/2020 |
| WO | WO 2006/136755 A2 | 12/2006 |
| WO | WO 2019/097147 A1 | 5/2019 |

\* cited by examiner

[Fig. 1]
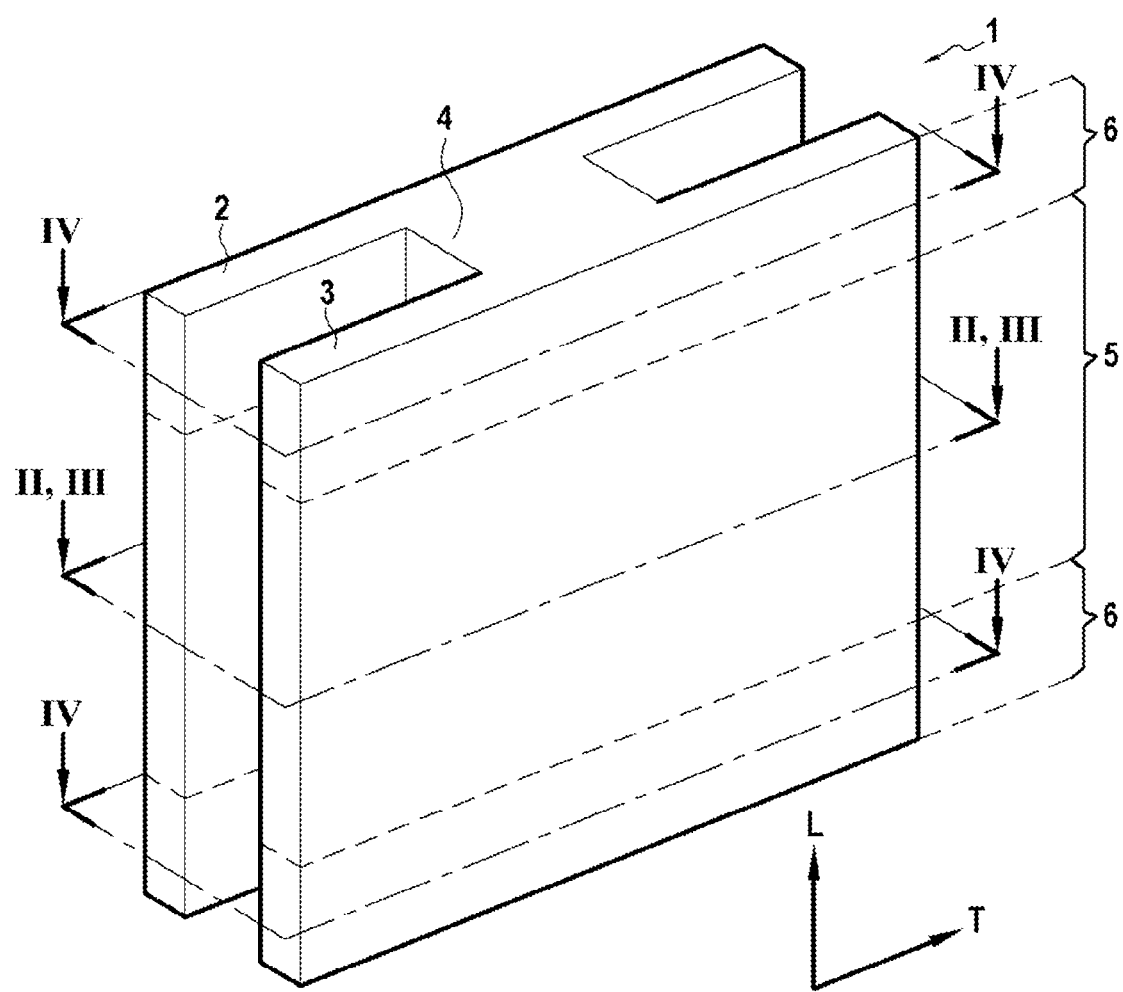

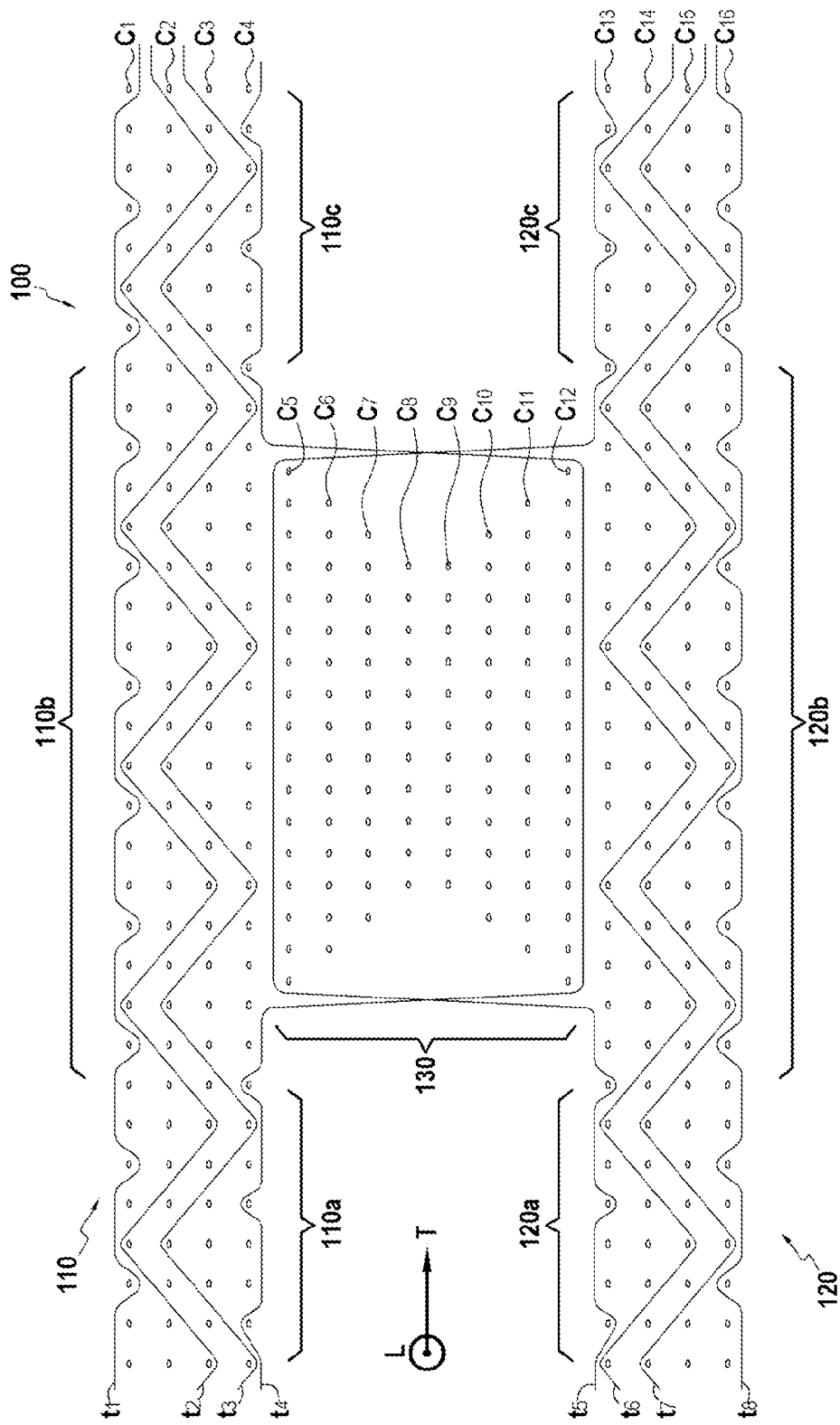

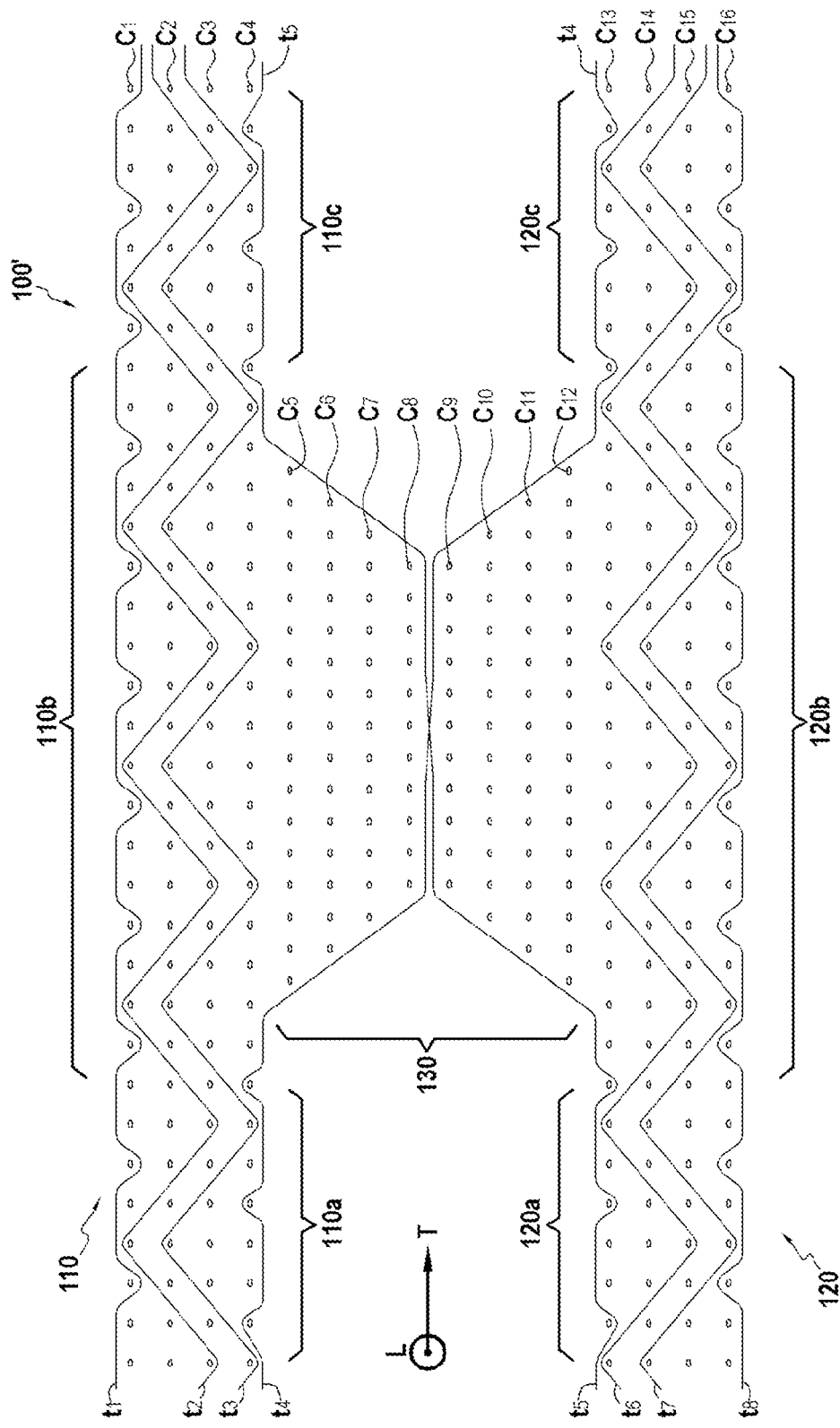
[Fig. 3]

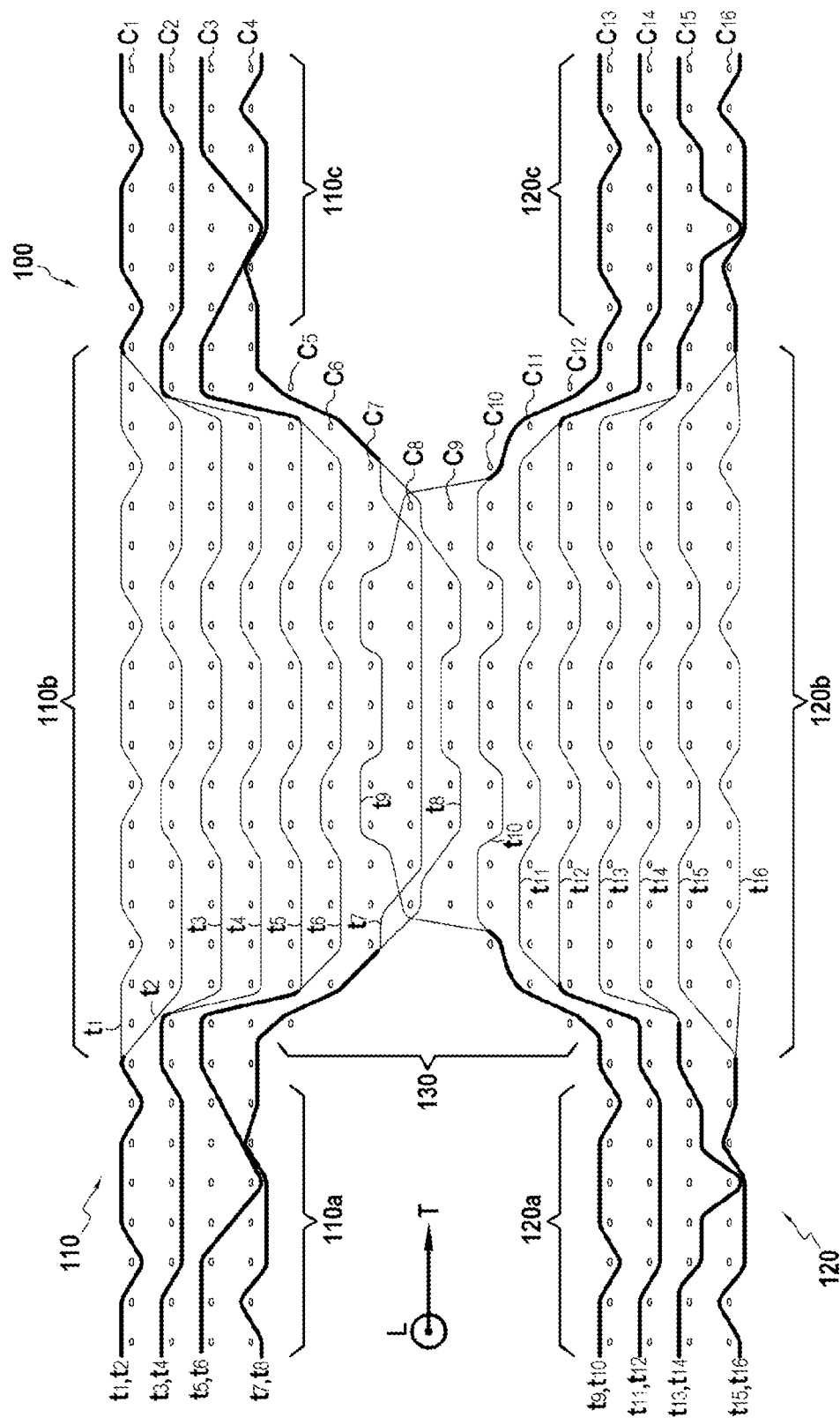
[Fig. 4]

[Fig. 5]
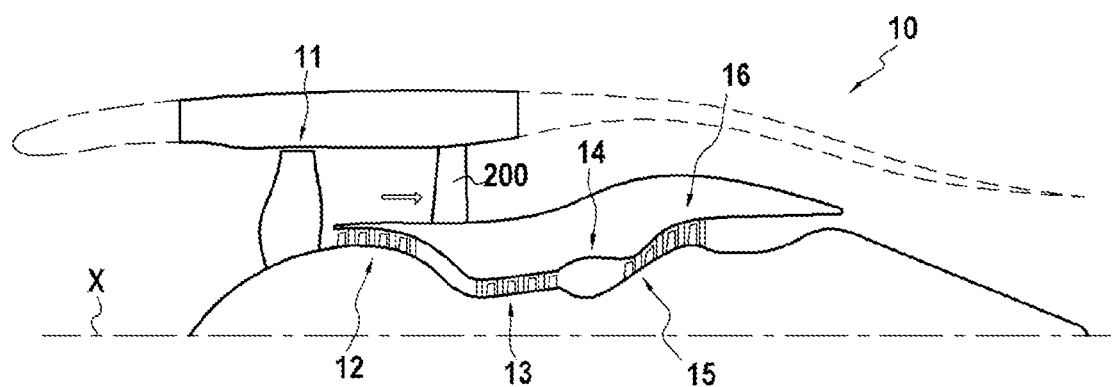

[Fig. 6]
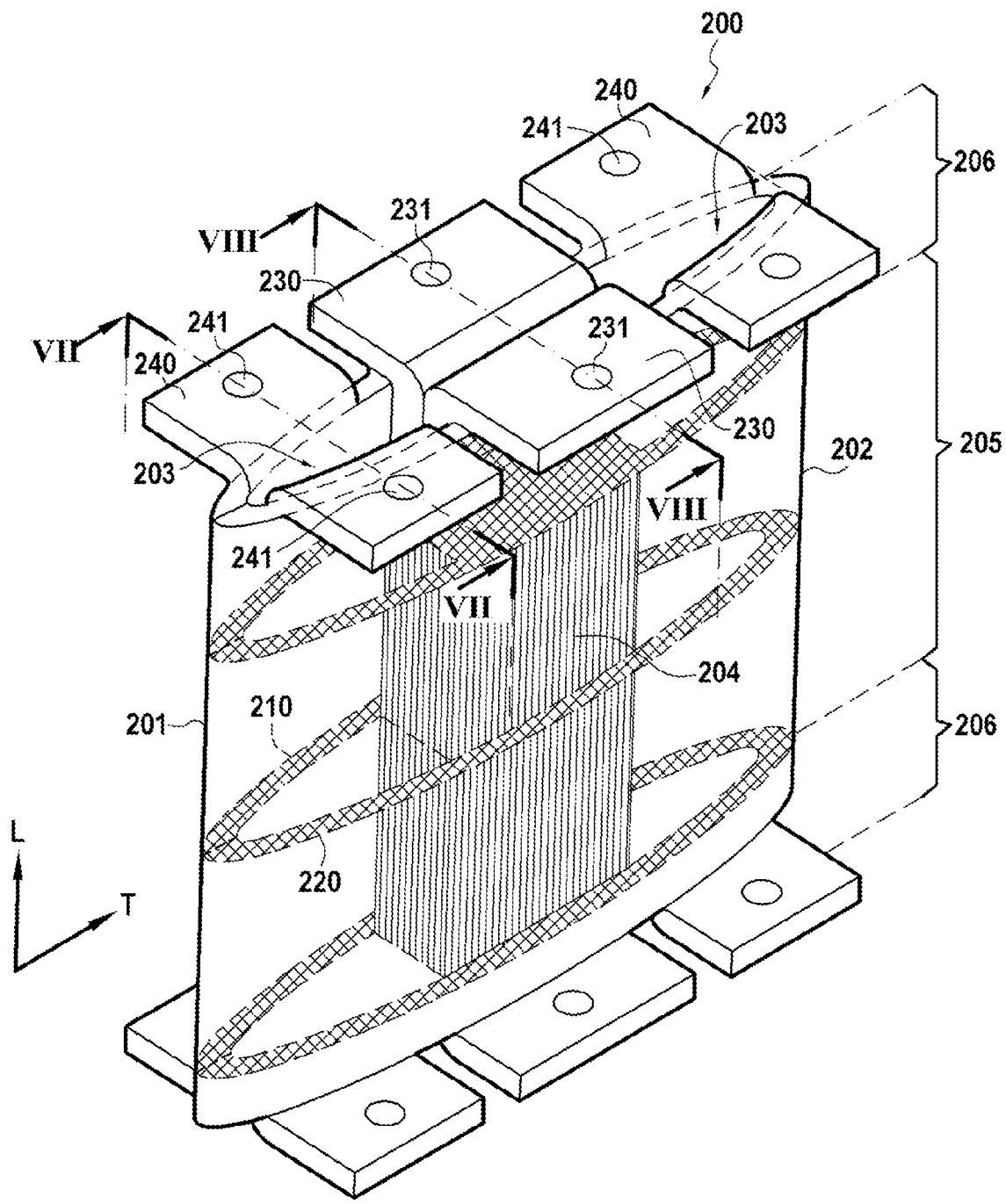

[Fig. 7]
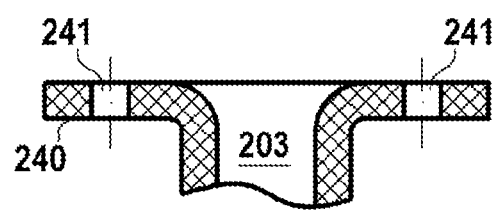
[Fig. 8]
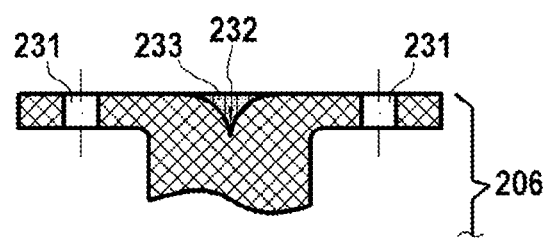

[Fig. 9]
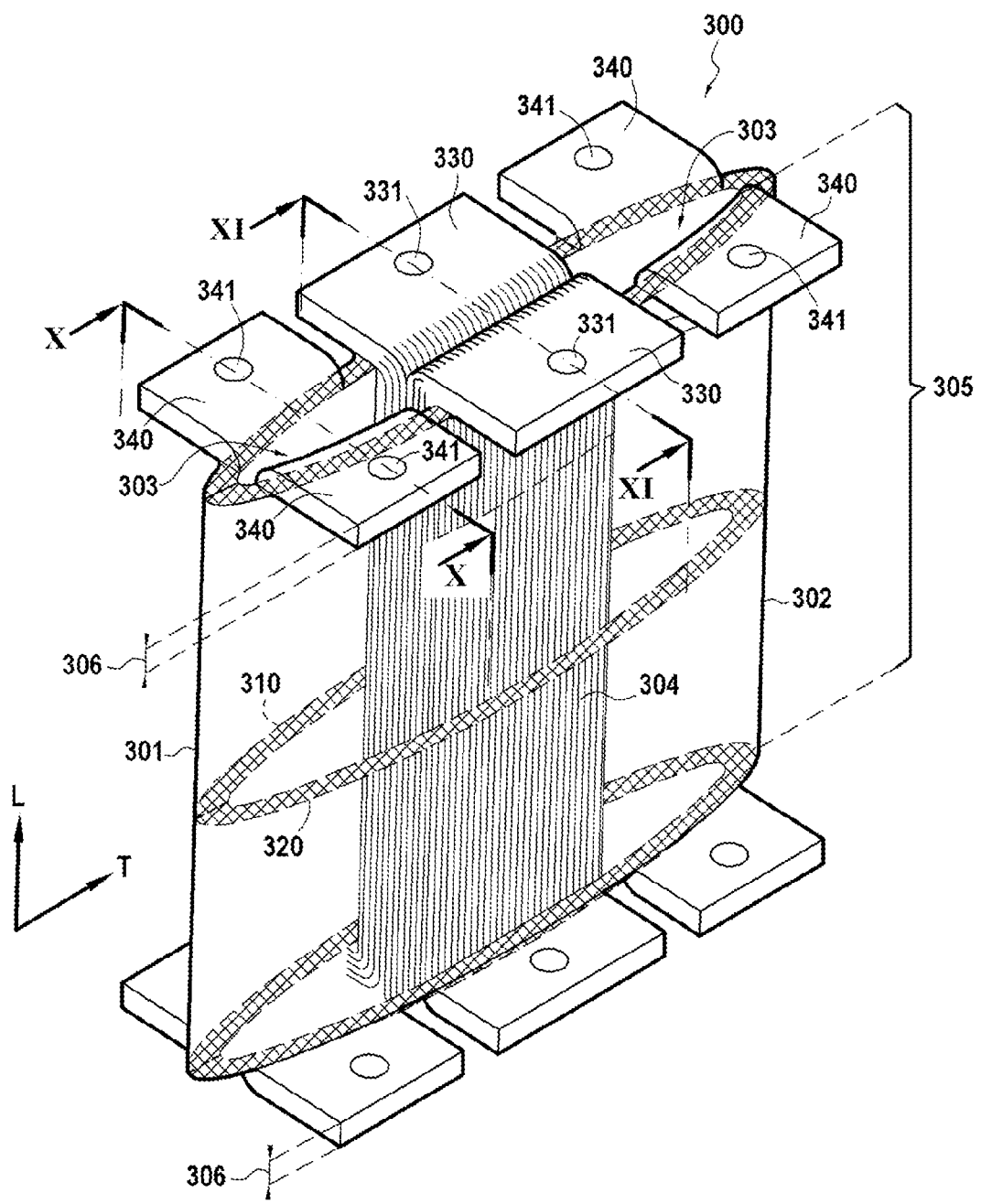

[Fig. 10]
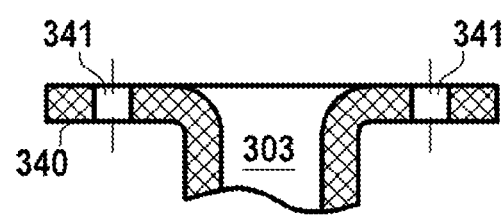
[Fig. 11]
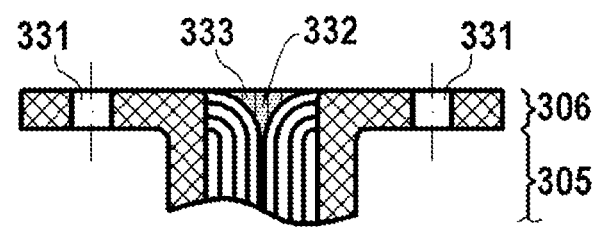

WOVEN FIBROUS PREFORM FOR PRODUCING A PART FROM COMPOSITE MATERIAL, IN PARTICULAR A TURBOMACHINE BLADE

CROSS-REFERENCE TO RELATED APPLICATIONS

This application is the U.S. National Stage of PCT/FR2021/050096, filed Jan. 19, 2021, which in turn claims priority to French patent application number 2000808filed Jan. 28, 2020. The content of these applications are incorporated herein by reference in their entireties.

TECHNICAL FIELD

The present invention relates to the general field of composite material parts. More precisely, the invention relates to a fibrous preform for forming a stiffened composite material part.

PRIOR ART

In a known manner, a composite material part can be obtained by producing a fibrous preform and densification of the preform by a matrix. According to the envisaged application, the preform can be made of glass, carbon or ceramic fibres, and the matrix can be made of an organic material (polymer), carbon or ceramic.

For parts with relatively complex shape, it is known to produce a fibrous structure or blank in a single piece by three-dimensional (3D) or multilayer weaving and to shape the fibrous structure in order to obtain a fibrous preform having a shape close to that of the part to be manufactured.

In the field of the manufacture of composite material turbomachine blades, it is continuously sought to increase the mechanical strength of the blade while reducing its mass. Even if it is currently possible to manufacture hollow composite material blades from a fibrous preform woven as a single piece, their stiffness must always be improved, in particular when the blades are inlet or outlet guide blades (IGV or OGV).

Thus, there is always a need for a single-piece fibrous preform which makes it possible to obtain composite material parts combining reduced mass and improved stiffness.

DISCLOSURE OF THE INVENTION

According to an aspect of the invention, this goal is achieved by a fibrous preform intended for forming the fibrous reinforcement of a composite material part with fibrous reinforcement densified by a matrix, the fibrous preform being made as a single piece and obtained by three-dimensional weaving of a first plurality of threads or strands extending in a first direction of the part with a second plurality of threads or strands extending in a second direction of the part perpendicular to the first direction, the preform comprising a first skin, a second skin and a stiffening portion connecting the first skin to the second skin, the stiffening portion being intended to form a stiffening element of the part in the first or second direction, characterised in that the preform has an intermediate portion extending at least in the first direction or second direction between two end portions, in that the stiffening portion comprises, in the intermediate portion, a plurality of non-woven threads or strands extending in at least the first direction or the second direction which are held together by a plurality of first threads or strands coming from the first skin and a plurality of second threads or strands coming from the second skin, and in that, in the end portions, the threads or strands of the longitudinal stiffening portion are woven with threads or strands.

Herein, "three-dimensional weaving", "3D weaving" and "multilayer weaving" shall mean a method of weaving by which at least some warp threads (or longitudinal threads) connect weft threads (or transverse threads) over a plurality of weft layers. Such a weaving can be produced on a jacquard loom, in a manner known per se.

The preform according to the invention is characterised in that it has a stiffening portion which has an improved stiffness in at least one direction. The stiffness is provided by the presence of non-woven threads which are held by threads extending in a perpendicular direction so as to remain straight in the preform. In addition, the non-woven threads are woven in the end portions, which keeps them taut in the preform. Such a pre-form can also make it possible to make composite material parts lighter while increasing their stiffness in a predetermined direction.

In an exemplary embodiment, the first threads or strands can be woven at the surface of the first skin, the second threads or strands are woven at the surface of the second skin, and, in each plane in the second direction of the intermediate portion, a first thread or strand and a second thread or strand cross twice on either side of the stiffening portion.

In an exemplary embodiment, the first threads or strands and the second threads or strands can be woven both at the surface of the first and second skin, and, in each plane in the second direction of the intermediate portion, a first thread or strand and a second thread or strand can cross once in the stiffening portion.

In an exemplary embodiment, at least some of the non-woven threads or strands present in the stiffening portion can have a titre greater than the titre of the threads or strands present in the first and second skin. This feature makes it possible to increase the stiffness of the stiffening element which will be formed from the stiffening portion when the preform is densified in order to form a composite material part. For example, the titre of the threads or strands in the skins can be less than or equal to 24 k, and the titre of the non-woven threads or strands in the stiffening portion can be greater than or equal to 96 k.

In an exemplary embodiment, the first or second skin can have, on the opposite side to the stiffening portion, a two-dimensional weaving at the surface.

In an exemplary embodiment, the threads or strands of the first plurality of threads or strands can be warp threads or strands and the threads or strands of the second plurality of threads or strands can be weft threads or strands.

In an exemplary embodiment, in a transverse plane of at least one end portion:
- threads or strands of the first skin and of the second skin are woven in pairs in the first skin and in the second skin on either side of the stiffening portion,
- the threads or strands of at least a first pair of threads or strands of the second plurality of threads or strands of the first skin are separated into two unitary threads or strands at the stiffening portion of the first plurality of threads or strands, said unitary threads or strands being separately woven with the threads or strands of the first plurality of threads or strands in said portion,
- the threads or strands of at least one second pair of threads or strands of the second plurality of threads or strands of the second skin are separated into two unitary threads or strands at the stiffening portion, said unitary threads or strands being separately woven with the threads or strands of the first plurality of threads or strands in said portion, and at least one thread or strand of the first pair and at least one thread or strand of the second pair cross at least twice in the stiffening portion.

In the end portions, the stiffening portion can thus be formed from pairs of threads or strands of the second plurality of threads or strands which are split (separated) into unitary threads or strands then woven separately with threads or strands of the first plurality of threads or strands which are added at the longitudinal stiffening portion. Through this weaving mode based on split pairs, the stiffening portion is thus connected by weaving to the skins, which ensures good stability of the assembly. In addition, it is not necessary to insert additional threads or strands of the second plurality of threads or strands in order to weave the threads or strands of the first plurality of threads or strands of the stiffening portion, which simplifies the weaving of the preform. The crossing of threads or strands of the first plurality of threads or strands coming from the first and second skin makes it possible to ensure the connection by weaving of the skins with the longitudinal stiffening portion, while increasing the mechanical strength of the assembly.

Another goal of the invention is a composite material part with fibrous reinforcement densified by a matrix comprising a fibrous preform such as that described above as fibrous reinforcement, the part having a first wall and a second wall formed by the first skin and the second skin of the fibrous preform between which extends a stiffening element formed by the stiffening portion of said preform. The stiffening element can absorb the forces exerted on the part by increasing its stiffness.

Such a part can be a reinforcement bar for an aircraft landing gear.

Such a part can form an aeronautical turbomachine blade, the first wall and the second wall corresponding respectively to a pressure face and to a suction face of the blade, the end portions of the preform forming fastening flanges of the blade.

The blade can in particular constitute an inlet or outlet guide blade of an aeronautical turbomachine. The use of a fibrous preform according to the invention is advantageous for this application because such a blade has structural functions for the engine, between a core thereof and an outer fairing. The stiffening element increases the mechanical strength of the blade under tension and compression. The blade can thus be hollow and comprise two cavities which extend longitudinally on either side of the stiffening element, reducing the mass in comparison to a solid blade.

In an exemplary embodiment, the blade can comprise a pair of central flanges and at least one pair of lateral flanges with at least one longitudinal end, the pair of central flanges being formed from a separation provided in the stiffening portion of the fibrous preform and the pair of lateral flanges being formed by extending the first skin and the second skin of the fibrous preform.

Alternatively, the pair of central flanges can be formed by reweaving threads or strands of the first plurality of threads or strands of the stiffening portion after separation of the flanges of the pair of central flanges.

BRIEF DESCRIPTION OF THE FIGURES

FIG. 1 shows a composite material part according to an embodiment of the invention.

FIG. 2 shows an example of a weave in a transverse plane in the intermediate portion of a fibrous preform according to an embodiment of the invention.

FIG. 3 shows an alternative embodiment of the weave of FIG. 2.

FIG. 4 shows an example of a weave in a transverse plane in the end portions of a fibrous preform according to an embodiment of the invention.

FIG. 5 is a highly schematic view in longitudinal section of an aeronautical turbomachine.

FIG. 6 is a schematic view of an outlet guide blade of an aeronautical turbomachine according to an embodiment of the invention.

FIG. 7 shows a longitudinal sectional view of the blade of FIG. 6 at one of its fastening flanges.

FIG. 8 shows a longitudinal sectional view of the blade of FIG. 6 at another of its fastening flanges.

FIG. 9 is a schematic view of an outlet guide blade of an aeronautical turbomachine according to another embodiment of the invention.

FIG. 10 shows a longitudinal sectional view of the blade of FIG. 9 at one of its fastening flanges.

FIG. 11 shows a longitudinal sectional view of the blade of FIG. 9 at another of its fastening flanges.

DESCRIPTION OF THE EMBODIMENTS

FIG. 1 shows an exemplary composite material part comprising a fibrous reinforcement densified by a matrix, the fibrous reinforcement of which can be obtained from a fibrous preform according to the invention. The part 1 comprises a first wall 2, a second wall 3 and a stiffening element 4 extending between the first wall 2 and the second wall 3. The stiffening element 4 takes the shape of a beam that extends in this case in a first direction or longitudinal direction L of the part 1 between the walls 2 and 3. Each wall 2, 3 extends in the longitudinal direction L and in a second direction or transverse direction T perpendicular to the longitudinal direction L.

Such a part 1 may form, for example, by adjusting its shape, a turbomachine blade or a landing gear reinforcement bar.

In the example described here, the part 1 is divided in the longitudinal direction and has an intermediate portion 5 which extends between two end portions 6. The weaves of the intermediate portion 5 and of the end portions 6 are different and will be described below. In another embodiment of the invention, the intermediate portion can be defined in the transverse direction.

FIG. 2 shows a cross-sectional view of a fibrous preform 100 according to an embodiment of the invention used for forming the fibrous reinforcement of the part of the FIG. 1.

The preform 100 is made as a single piece and obtained by three-dimensional weaving. In three-dimensional weaving, the weft threads connect together warp threads belonging to different layers of warp threads, with the exception of the weft threads which may be present at the surface in order to produce a two-dimensional weaving and the possible presence of local separations between adjacent layers of warp threads. Various 3D or multilayer weaves can be used, such as interlock, multiple satin or multiple plain weaves for example, as described in document WO 2006/136755.

The preform 100 comprises a first skin 110 intended here to form the first wall 2 of the part 1, and a second skin 120 intended to form the second wall 3 of the part 1. The first skin 110 and the second skin 120 are connected by a stiffening portion 130 intended to form the stiffening element 4 of the part 1. In the example described here, the stiffening portion extends in the longitudinal direction. In another embodiment of the invention, the stiffening portion can extend in the transverse direction.

FIG. 2 shows layers $c_1$-$c_{16}$ of warp (longitudinal) threads or strands and the paths of weft (transverse) threads or strands $t_1$-$t_8$. For the purposes of simplification, the terms warp thread and weft thread are used in the rest of the description. Thus, FIG. 2 shows a weft plane of the fibrous preform 100.

More precisely, FIG. 2 shows a weave example in a transverse plane II of FIG. 1 located in the intermediate portion 5 of the part 1.

Here, the first skin 110 comprises four layers of warp threads $c_1$-$c_4$, which are connected by weft threads $t_1$-$t_4$. Similarly, the second skin 120 comprises four layers of warp threads $c_{13}$-$c_{16}$, which are connected by weft threads $t_5$-$t_8$. The longitudinal stiffening portion 130 comprises eight layers of warp threads $c_5$-$c_{12}$. The weft threads $t_1$ to $t_8$ can be unitary or be in the form of pairs of the threads.

The first skin 110 can be divided into three portions 110a, 110b and 110c in the transverse direction T. The first portion 110a and the third portion 110c constitute free portions of the first skin 110 which are located on either side of the central portion 130. Similarly, the second skin 120 can be divided into three portions 120a, 120b and 120c in the transverse direction T. The first portion 120a and the third portion 120c constitute free portions of the second skin 120 which are located on either side of the central portion 130.

The weft thread $t_1$ is woven at the surface of the first skin 110 with a two-dimensional weaving. The weft threads $t_2$ and $t_3$ are woven in the first skin 110 with a three-dimensional weaving. The weft thread to is woven at the surface of the first skin 110 (an internal surface) in the portions 110a and 110c.

Symmetrically, the weft thread $t_8$ is woven at the surface of the second skin 120 with a two-dimensional weaving. The weft threads $t_6$ and $t_7$ are woven in the second skin 120 with a three-dimensional weaving. The weft thread to is woven at the surface of the second skin 120 (an internal surface) in the portions 120a and 120c.

In the intermediate portion 5 of the part, the longitudinal stiffening portion 130 is formed by a plurality of layers of non-woven warp threads $c_5$ to $c_{12}$ which are held together by the weft threads $t_4$ and $t_5$ coming, respectively, from the first skin 110 and the second skin 120. The weft threads $t_4$ and $t_5$ cross twice on either side of the longitudinal stiffening portion 130 so as to enclose the non-woven warp threads $c_5$ to $c_{12}$.

In the longitudinal stiffening portion 130 in the intermediate portion 5 of the part, the weft threads $t_4$ and $t_5$ of all the weft layers together form a sort of tube in which the warp threads $c_5$ to $c_{12}$ are held straight, giving the longitudinal stiffening portion 130 its stiffness.

An alternative embodiment of the weave of FIG. 2 is shown with fibrous preform 100' in FIG. 3. In this alternative, the weft threads $t_4$ and $t_5$ cross only once, close to the centre of the longitudinal stiffening portion 130, and enclose the warp threads $c_5$ to $c_{12}$ in two groups. In this case, the weft thread to encloses the warp threads of layers $c_5$ to $c_8$, whereas the weft thread $t_5$ encloses the warp threads $c_9$ to $c_{12}$. As before, the warp threads $c_5$ to $c_{12}$ are held straight by the weft threads in order to give the longitudinal stiffening portion 130 its stiffness.

In accordance with the invention, the warp threads $c_5$ to $c_{12}$ which are not woven in the intermediate portion 5 are then woven in the end portions 6 in order to keep them straight and taut. They can be woven in the end portions 6 in conventional manner with the weft threads, for example with an interlock weave, or having a particular weave such as that of FIG. 3.

FIG. 3 shows a particular weave example in the end portions of the preform 100, in the transverse planes IV of FIG. 1.

Here, the first skin 110 comprises four layers of warp threads $c_1$-$c_4$, which are connected by weft threads $t_1$-$t_8$. Similarly, the second skin 120 comprises four layers of warp threads $c_{13}$-$c_{16}$, which are connected by weft threads $t_9$-$t_{16}$. The stiffening portion 130 comprises eight layers of warp threads $c_5$-$c_{12}$ which correspond to the non-woven warp threads of the intermediate portion 5. It should be noted that in the first skin 110 and in the second skin 120 there are twice as many weft threads as layers of warp threads because the weft threads are woven in pairs in certain parts of the skins 110 and 120.

In the first 110a and in the third portion 110c, the weft threads are woven in pairs. Thus, for example, the weft threads $t_1$ and $t_2$ are woven together in the portion 110a and in the portion 110c, in other words they follow the same path. In particular, in the portions 110a and 110c, the weaving can be interlock weaving. It should be noted that on the surface of the first skin 110 opposite the stiffening portion 130, and in portions 110a and 110c, the weaving of the weft threads $t_1$ and $t_2$ is two-dimensional so as to give the composite material part a smooth surface.

In the first portion 120a and in the third portion 120c, the weft threads are woven in pairs. Thus, for example, the weft threads $t_{15}$ and $t_{16}$ are woven together in the portion 120a and in the portion 120c, in other words they follow the same path. In particular, in the portions 120a and 120c, the weaving can be interlock weaving. It should be noted that on the surface of the second skin 120 opposite the stiffening portion 130, and in portions 120a and 120c, the weaving of the weft threads $t_{15}$ and $t_{16}$ is two-dimensional so as to give the composite material part a smooth surface.

In the illustrated example, the weft threads of each pair of weft threads $t_1$-$t_2$, $t_3$-$t_4$, $t_5$-$t_6$ and $t_7$-$t_8$ are separated into two unitary threads at the stiffening portion 130, and in general on either side thereof. Once separated, the unitary threads are woven separately with the warp threads in the portion 110b and in the stiffening portion 130. The term "separately woven" shall mean that the threads no longer follow the same path. The separation of the pairs (or splitting of the pairs) thus makes it possible to double the number of weft threads available at the stiffening portion in order to weave the latter with additional warp thread layers. Hence, the weft threads $t_1$ to $t_8$ are woven with warp thread layers $c_1$ to $c_4$ in the portion 110b of the first skin 110, whereas the weft threads $t_5$ to $t_8$ are woven respectively with the warp threads layers $c_5$, $c_6$, $c_8$ and $c_9$ in the stiffening portion 130. Some of the unitary weft threads of the first skin 110 are woven with the warp thread layers of the first skin 110, and others of the unitary weft threads of the first skin 110 are woven with the warp thread layers of the stiffening portion 130.

In the illustrated example, the weft threads of each pair of weft threads $t_9$-$t_{10}$, $t_{11}$-$t_{12}$, $t_{13}$-$t_{14}$ and $t_{15}$-$t_{16}$ are separated into two unitary threads at the stiffening portion 130, and in general on either side thereof. Once separated, the unitary threads are woven separately with the warp threads in the portion 120b and in the stiffening portion 130. Hence, the weft threads $t_{13}$ to $t_{16}$ are woven with warp thread layers $c_{13}$ to $c_{16}$ in the portion 120b of the second skin 120, whereas the weft threads $t_9$ to $t_{12}$ are woven respectively with the warp threads layers $c_7$, $c_{10}$ to $c_{12}$ in the stiffening portion 130.

Some of the unitary weft threads of the second skin 120 are woven with the warp thread layers of the second skin 120, and others of the unitary weft threads of the second skin 120 are woven with the warp thread layers of the stiffening portion 130.

In the illustrated example, the unitary weft threads obtained by splitting pairs of weft threads are each woven with a different single warp thread layer in the portions 110b and 120b and in the stiffening portion 130.

In the illustrated example, the unitary weft threads $t_7$ and $t_8$ coming from the first portion 110 cross the weft thread $t_9$ coming from the second portion 120 in the stiffening portion 130. Here, this crossing enables the warp thread layers $c_7$, $c_8$ and $c_9$ to be connected to the first skin 110 by the weft threads $t_7$ and $t_8$, and to the second skin 120 by the weft thread $t_9$. Of course, other weaves can be envisaged keeping the crossing, at least twice, of weft threads coming from the first 110 and from the second 120 skin in the stiffening portion 130 in order to ensure the cohesion of the preform 100. Hence, in this example, only some of the unitary weft threads coming from the first skin 110 cross only some of the unitary weft threads coming from the second skin 120; the other unitary weft threads being woven with different warp thread layers without crossing one another.

In the illustrated example, there are four warp threads per column in the first skin 110 and in the second skin 120, i.e. eight threads per column at the free portions 110a, 120a, 110c, 120c of the skins. The number of warp threads of a given warp column is progressively increased here in order to attain sixteen warp threads per column in the preform at the stiffening portion 130. In this example, the weft threads of the pairs of weft threads are separated at different warp columns, in other words at different locations in the transverse direction T, this enables a gradual introduction of the new warp threads and easier weaving.

It can be advantageous that the titre (i.e. the average number of filaments constituting the threads) of the warp threads of the layers $c_5$ to $c_{12}$ in the stiffening portion 130 is greater than the titre of the warp threads of the layers $c_1$ to $c_4$ and $c_{13}$ to $c_{16}$ in the skin 110 and 120, in order to increase the stiffening function of the stiffening portion 130 in a composite material part.

According to an alternative embodiment of the invention, the intermediate portion of the part can extend in the transverse direction. In this case, the longitudinal stiffening portion is formed by a plurality of layers of non-woven weft threads which are held together by the warp threads coming, respectively, from the first skin and the second skin. The warp threads can cross twice on either side of the stiffening portion so as to enclose the non-woven weft threads or only cross once close to the centre of the stiffening portion and enclose the weft threads in two groups.

FIG. 5 shows a schematic view in the longitudinal cross-section of a turbofan engine 10 centred on the axis X. It includes, from upstream to downstream: a fan 11, a low-pressure compressor 12, a high-pressure compressor 13, a combustion chamber 14, a high pressure turbine 15 and a low pressure turbine 16. At the inlet to the turbofan engine 10, the air stream entering the fan 11 is divided into a primary stream or hot stream, and a secondary stream or cold stream. The flow channel of the secondary stream conventionally comprises a flow straightener provided with outlet guide blades 200 (or OGV for Outlet Guide Vanes) arranged downstream of the fan 11, which have, in particular, the function of straightening the cold stream at the outlet of the fan 11 in order to derive the maximum thrust from it. The blades 200 also have a structural function and must, in particular, be capable of supporting forces exerted by the engine in operation or an impact due to the intake of an object by the fan 11, or even the detachment of a blade of the fan 11. Hence, these blades 200 must both have satisfactory mechanical properties while being sufficiently light to improve the propulsive efficiency of the engine.

An example of use of a preform 100 according to an embodiment of the invention for manufacturing an aeronautical turbomachine blade made of composite material, in particular an outlet guide blade 200, will now be described with reference to FIGS. 6 to 8.

FIG. 6 shows, in a highly schematic manner, an outlet guide blade 200 of an aeronautical turbomachine. The blade 200 extends in the longitudinal direction L, and in the transverse direction T between a leading edge 201 and a trailing edge 202. In addition, it has a pressure face 210 and a suction face 220. At each of its longitudinal ends, the blade 200 has a pair of central flanges 230 and two pairs of lateral flanges 240 which enable its fastening in the engine by means of fastening holes 231, 241. The blade 200 is hollow and comprises two longitudinal cavities 203 opening at each longitudinal end of the blade 200. The longitudinal cavities are separated by a stiffening element 204 which extends between the pressure 210 and suction 220 faces in the longitudinal direction L.

The blade 200 is made of composite material with fibrous reinforcement densified by a matrix. The fibrous reinforcement of the blade 200 (visible by transparency in the blade 200 of FIG. 4) is obtained in this case from a fibrous preform 100 such as that illustrated in FIGS. 2 to 4. In particular, the first 110 and second 120 skins of the fibrous preform 100 form the pressure 210 and suction 220 faces of the blade 200, and the longitudinal stiffening portion 130 of the preform 100 forms the stiffening element 204. The skins 110 and 120 of the fibrous preform 100 are joined at their free ends in order to form the edges 201 and 202 of the blade 200.

The fibrous reinforcement of the blade 200 is, as for the preform 100, longitudinally divided between an intermediate portion 205 in which the warp threads of the stiffening element 204 are not woven, and two end portions 206 in which the warp threads of the stiffening element 204 are woven with the weft threads. The weave in a transverse plane of the intermediate portion 205 can be like that of FIG. 2 or 3. The weave in a transverse plane of an end portion 206 in the body of the blade can be like that of the FIG. 4.

The intermediate portion 205 extends over only a portion of the height of the body of the blade 200, and the end portions 206 extend from the intermediate portion 205 and extend beyond the body of the blade 200 in order to form pairs of flanges 230 and 240.

FIG. 7 shows a longitudinal sectional view of the fibrous reinforcement of the blade 200 at a pair of lateral flanges 240. It can be seen that the fibrous reinforcement is continuous between the pressure and suction faces, and the ends of the flanges of the pair of flanges 240. The pair of lateral flanges 240 is more specifically obtained by extending the first 110 and second 120 skins of the fibrous preform 100 and unfolding these beyond the end of the body of the blade 200.

FIG. 8 shows a longitudinal sectional view of the fibrous reinforcement of the blade 200 at the pair of central flanges 230. It can be seen that the fibrous reinforcement is continuous between the stiffening element 204 and the ends of the flanges of the central pair of flanges 230. The pair of central flanges 230 is more specifically obtained from a separation 232 provided in the fibrous preform 100 during its weaving. In order to obtain such a separation, the weaving together of layers of longitudinal threads by transverse threads has been intentionally omitted, so that the preform can be unfolded. In order to fill the space created by the unfolding of the separated portions of the fibrous preform, an insert 233 can be placed in the separation 232.

FIGS. 9 to 11 show an alternative blade 300. The reference signs corresponding to blade 200 and blade 300 designate identical features (200 becomes 300).

In this alternative, the fibrous reinforcement of blade 300 is different from the preceding one in that the intermediate portion 305 extends over the entire height of the body of the blade 300, and in that the end portions 306 only form the flanges 330 and 340. In particular, the warp threads of the longitudinal stiffening element 204 are again woven with the weft threads only at the central flange 330 by separating into two (FIG. 11).

In general, the fibres of the fibrous preform 100 are made of a material chosen according to the envisaged application, for example made of glass, carbon or ceramic.

The densification of the fibrous preform by a matrix in order to obtain a composite material part is carried out by holding the preform in a shaping tool at least until the preform is rigid (or strengthened). In particular, inflatable bladders can be used in order to form the hollow portions 203 or 303 of the blade 200 or 300.

The nature of the matrix is chosen according to the envisaged application, for example an organic matrix obtained, in particular, from a polymer matrix precursor resin such as an epoxy, bismaleimide or polyimide resin, or a carbon matrix or ceramic matrix.

In the case of an organic matrix, the fibrous preform is impregnated by a composition containing the matrix precursor resin, before shaping in a tool, or after shaping, the impregnation in the latter case being carried out, for example, by infusion or a resin transfer moulding (RTM) method, in a suitable mould. In the case of a carbon or ceramic matrix, the densification can be carried out through chemical vapour infiltration (CVI) or through impregnation by a liquid composition containing a carbon or ceramic precursor resin and heat treatment for pyrolysis or ceramisation of the precursor, these methods being known per se.

The invention claimed is:

1. A fibrous preform intended for forming a fibrous reinforcement of a composite material part with fibrous reinforcement densified by a matrix, the fibrous preform being made as a single piece and obtained by three-dimensional weaving of a first plurality of threads or strands extending in a first direction of the composite material part with a second plurality of threads or strands extending in a second direction of the composite material part perpendicular to the first direction, the fibrous preform comprising a first skin, a second skin and a stiffening portion connecting the first skin to the second skin, the stiffening portion being intended to form a stiffening element of the composite material part in the first or second direction, wherein the fibrous preform has an intermediate portion extending at least in the first direction or second direction between two end portions, wherein the stiffening portion comprises, in the intermediate portion, a plurality of non-woven threads or strands extending in at least the first direction or the second direction and which are held together by a plurality of first threads or strands coming from the first skin and a plurality of second threads or strands coming from the second skin, and wherein, in the two end portions, the threads or strands of the stiffening portion are woven with threads or strands of the first or second plurality of threads or strands.

2. The fibrous preform according to claim 1, wherein threads or strands of the first or second plurality of threads or strands are woven at a surface of the first skin, threads or strands of the first or second plurality of threads or strands are woven at a surface of the second skin, and, in each plane in the second direction of the intermediate portion, a first thread or strand of the first or second plurality of threads or strands and a second thread or strand of the first or second plurality of threads or strands cross twice on either side of the stiffening portion.

3. The fibrous preform according to claim 1, wherein threads or strands of the first or second plurality of threads or strands and threads or strands of the first or second plurality of threads or strands are wovenable both at a surface of the first and second skin, and, in each plane in the second direction of the intermediate portion, a first thread or strand of the first or second plurality of threads or strands and a second thread or strand of the first or second plurality of threads or strands cross once in the stiffening portion.

4. The fibrous preform according to claim 1, wherein at least some of the non-woven threads or strands present in the stiffening portion have a titre greater than a titre of the threads or strands of the first plurality of threads or strands present in the first and second skins.

5. The fibrous preform according to claim 1, wherein the first or second skin has, on an opposite side to the stiffening portion, a two-dimensional weaving at a surface.

6. The fibrous preform according to claim 1, wherein the threads or strands of the first plurality of threads or strands are warp threads or strands and the threads or strands of the second plurality of threads or strands are weft threads or strands.

7. The part made of composite material with fibrous reinforcement densified by the matrix comprising the fibrous preform according to claim 1 as fibrous reinforcement, the part having a first wall and a second wall formed by the first skin and the second skin of the fibrous preform between which extends the stiffening element formed by the stiffening portion of said fibrous preform.

8. The part according to claim 7, forming an aeronautical turbomachine blade, the first wall and the second wall corresponding respectively to a pressure face and to a suction face of the aeronautical turbomachine blade, the two end portions of the fibrous preform forming fastening flanges of the aeronautical turbomachine blade.

* * * * *